United States Patent [19]
Robichaud et al.

[11] Patent Number: 5,306,533
[45] Date of Patent: Apr. 26, 1994

[54] OXYGEN BARRIER CONTAINER

[75] Inventors: Arthur W. Robichaud, West Worthington; Michael S. Mabee, Dublin, both of Ohio

[73] Assignee: Combibloc, Inc., Columbus, Ohio

[21] Appl. No.: 874,082

[22] Filed: Apr. 27, 1992

[51] Int. Cl.$^5$ .............................................. B65D 85/00
[52] U.S. Cl. ................................... 428/34.2; 428/36.7; 428/511; 428/516
[58] Field of Search ...................... 428/516, 511, 34.2, 428/36.7

[56] References Cited

U.S. PATENT DOCUMENTS

| | | | |
|---|---|---|---|
| Re. 33,376 | 10/1990 | Gibbons et al. | 428/34.2 |
| 3,972,467 | 8/1976 | Whillock et al. | 229/14 BL |
| 4,233,367 | 11/1980 | Ticknor et al. | 428/476.3 |
| 4,300,969 | 11/1981 | Frydendal | 156/224.11 |
| 4,407,873 | 10/1983 | Christensen et al. | 428/35 |
| 4,481,262 | 11/1984 | Shida et al. | 428/441 |
| 4,513,036 | 4/1985 | Thompson et al. | 428/35 |
| 4,537,836 | 8/1985 | Adur et al. | 428/522 |
| 4,698,246 | 10/1987 | Gibbons et al. | 428/35 |
| 4,701,360 | 10/1987 | Gibbons et al. | 428/35 |
| 4,734,331 | 3/1988 | Giles, Jr. et al. | 428/412 |
| 4,777,088 | 10/1988 | Thompson et al. | 428/323 |
| 4,789,575 | 12/1988 | Gibbons et al. | 428/34.2 |
| 4,802,943 | 2/1989 | Gibbons et al. | 156/244.23 |
| 4,859,513 | 8/1989 | Gibbons et al. | 428/34.2 |
| 4,861,526 | 8/1989 | Gibbons et al. | 264/22 |
| 4,880,701 | 11/1989 | Gibbons et al. | 428/34.2 |
| 4,888,222 | 12/1989 | Gibbons et al. | 428/34.2 |
| 4,921,733 | 5/1990 | Gibbons et al. | 428/34.2 |
| 4,929,476 | 5/1990 | Gibbons et al. | 428/34.2 |
| 4,940,612 | 7/1990 | Gibbons et al. | 428/34.2 |
| 4,948,640 | 8/1990 | Gibbons et al. | 428/34.9 |
| 4,950,510 | 8/1991 | Massouda | 428/34.2 |
| 4,981,739 | 1/1991 | Gibbons et al. | 428/34.2 |
| 4,983,431 | 1/1991 | Gibbons et al. | 428/34.2 |
| 4,988,546 | 1/1991 | Tanner et al. | 428/34.2 |
| 5,002,833 | 3/1991 | Kinsey et al. | 428/516 |
| 5,059,459 | 10/1991 | Huffman | 428/34.2 |
| 5,116,649 | 5/1992 | Massouda | 428/34.2 |

FOREIGN PATENT DOCUMENTS 87301665.3  11/1987  European Pat. Off. ....... B65D 5/00
88304075.0  11/1988  European Pat. Off. ....... B32B 27/10

OTHER PUBLICATIONS

D. Djordjevic, "Barrier Co-extrusion Coating as a Foil Replacement in Paperboard Lamination," Aseptipak '84, pp. 135-139 (1984).

T. Iwanimi & H. Honda, "EVOH Coextrusion Coating and Laminating," Coex '85-Fifth Annual International Conference on Coextrusion (Oct. 9-11, 1985).

P. Cloeren, "Performance and Economics of Barrier Coextrusion Coatings," Coex '83-Third Annual International Conference on Coextrusion (Oct. 3-4, 1983).

L. Baccaro et al., "Materials and composites for high-temperature barrier packaging", Tappi Journal, vol. 68, No. 1, pp. 59-63 (Jan. 1985).

T. Iwanimi & Y. Hirai, "Ethylene vinyl alcohol resins for gas-barrier material," Tappi Journal, vol. 66, No. 10, pp. 85-90 (Oct. 1983).

G. Burk, "Infrared sensors control thickness of film-coextrusion plies," Modern Plastics, pp. 84-88 (Jan. 1984).

F. Baker & J. Willard, "New heat seal coatings widen your performance choices," Package Engineering, pp. 62-65 (Jul. 1974).

E. Martin, "The future of coextrusions in high barrier packaging," Converting and Packaging, pp. 10-14 (Dec. 1985).

V. Stannett, "The permeability of plastic films and coated papers to gases and vapors," Converting and Packaging, pp. 22-26 (Sep. 1985).

*Primary Examiner*—Edith Buffalow
*Attorney, Agent, or Firm*—Porter, Wright, Morris & Arthur

[57] ABSTRACT

An oxygen barrier laminate structure for producing an aseptic, oxygen barrier packaging or container comprising a substrate having an inner surface and an outer surface, a first low density polyethylene layer coated on the outer surface of the substrate, a multi-layer oxygen barrier coextrusion coated interior to the substrate and a second, thick, low density polyethylene layer coated on the multi-layer coextrusion. An optional extra low density polyethylene layer may be added on the inside surface of the substrate. A photic barrier layer may also be employed.

9 Claims, 1 Drawing Sheet

OXYGEN BARRIER CONTAINER

BACKGROUND OF THE INVENTION

This invention relates generally to food and beverage packagings and, more particularly, to oxygen barrier laminate structures for producing aseptic packagings and containers.

Heat-sealable low density polyethylenes are popular components of current paperboard food and non-food packagings and containers. To provide a suitable barrier to oxygen and light transmission, structures with materials such as aluminum foil have been utilized in the production of these paperboard packagings. However, the unrestricted use of aluminum foil in any packaging renders that packaging non-microwaveable.

Oxygen permeability is a key consideration in aseptic, shelf-stable packaging because if oxygen is allowed to react with a food or beverage product it can result in deterioration of many aspects of product quality. Attempts have been made to produce an oxygen barrier container without the use of aluminum foil. One such type of container also has the requirement that the laminate used to form the container must have a very thin inner or product contact layer (0.7 mil or less) of low density polyethylene (LDPE) in order to achieve its desired results of minimizing absorption of essential flavor oils contained in citrus juice and other beverage products. Such a thin product contact layer is not acceptable in the aseptic packaging of the present invention because it cannot provide for commercial sterilization.

The present invention involves aseptic packaging which means commercially sterile packaging having no living microorganisms capable of growth inside the sealed container.

Aseptic packaging can provide shelf life of up to a year or more prior to opening without the need for preservatives or refrigeration. Conversely traditional gable top cartons (commonly used for the non-aseptic packaging of milk and juice) rely on refrigeration to retard microbial activity. But even under refrigeration, the shelf life of milk or juice in a non-aseptic carton is limited, in part due to the lack of adequate package seals for keeping the product isolated from outside microorganisms.

The produce contact surface of aseptic packaging is sterilized separately from the product itself. Thus, when the package is filled with pre-sterilized product, the inner seals of the packaging must be free of microorganisms. All such inner seals (formed when the laminated structure is folded and bonded to itself to form a desired container shape) should have no unfilled voids or cavities where microorganisms may be shielded from the sterilizing process.

To fill such voids in aseptic packaging of the present invention, the inner, product contact layer is preferably thick to an extent that it will adequately "flow" during formation of the aseptic package seals and thereby fill any such voids or cavities inside the package.

In one method of manufacturing the aseptic packaging of the present invention, a flat card ("blank") is first produced which is made of several layers of material bonded together. This multi-layer structure composition is the subject of the present patent application. In one type of packaging of the present invention, the blank takes the final form of a rectangular shaped box enclosed on all six sides (top, bottom, and four walls) of the box.

In the manufacturing process of the packaging material, the final step is to form a sleeve, for example as described in U.S. Pat. No. 4,239,150. In this step, the two sides of the flat multi-layer blank are brought together to form a back seam by flame sealing, thus producing the sleeve.

In the aseptic filling process, the sleeve is placed on a mandrel which allows for the formation of the bottom seals of the package. The bottom seals are formed by heat and pressure, utilizing the thick LDPE inner layer of the multi-layer sleeve. The heat applied to the innermost layer of the multi-layer sleeve enables it to "flow" to fill voids and cavities. The interior of the open-top box, including all inner seal areas, is then sterilized with hydrogen peroxide vapor which is then evaporated. Sterilized product is then deposited through the top opening to fill the box. The top portion of the box is then closed and thermally sealed.

Thus the seals formed in an aseptic package serve a structural (i.e., rigidity), a mechanical (i.e., liquid tight) and a biological (i.e., microbial seal) purpose.

In addition to oxygen impermeability, aluminum foil also serves a light barrier function. Packaging not containing aluminum foil may require other means to block or inhibit light transmission in order to preserve product quality. Light penetration of packaging material results in chemical reactions in some products which adversely affect the qualities of taste, smell, color, shelf life, etc.

As many units of measurement are discussed in the description of the present invention, the following conversions are appropriate for purposes of this discussion:

| CONVERSON FACTORS* | | |
|---|---|---|
| LDPE** (density .917) | 1 mil = 23.30 g/m$^2$ | 10 g/m$^2$ = .429 mil |
| EVOH** (density 1.18) | 1 mil = 29.98 g/m$^2$ | 10 g/m$^2$ = .334 mil |

*1 mil = 1/1000 inch
1 m$^2$ = 1 square meter
1 g = 1/1000 kilogram
1 ream = 3000 sq. ft.
**EVOH - Ethylene Vinyl Alcohol
**LDPE - Low Density Polyethylene

SUMMARY OF THE INVENTION

In aseptic packaging of the present invention, the inner product contact layer will preferably be of a thickness of at least 1.4 mil (32 g/m$^2$) or greater to allow for "flowing" of the product contact layer in critical seal areas when the packaging is formed and shaped so as to fill all the voids and thereby create a sterilizable seal as well as a structural and liquid seal for the product contents. In one preferred embodiment of the present invention, the product contact layer is a 1.7 mil (40 g/m$^2$) thick layer of LDPE.

The present invention is a multi-layer oxygen barrier structure having a substrate, preferably a paperboard layer, on the outside of which is a layer of LDPE. On the inside of the paperboard is an adhesive tie layer. On the inside of the tie layer is an oxygen barrier material, preferably an ethylene vinyl alcohol copolymer (EVOH). On the inside of the oxygen barrier layer is a second adhesive tie layer. Finally, on the inside of the second adhesive tie layer is a thick layer of LDPE.

The invention also provides an embodiment comprising an oxygen barrier laminate structure for producing an aseptic oxygen barrier container comprising a substrate having an inner and an outer surface, a first LDPE layer coated on the outer surface of the substrate, a multi-layer extrusion having an inner surface and an outer surface wherein the outer surface of the multi-layer extrusion is coated on the inner surface of the substrate, the multi-layer extrusion comprising a first adhesive tie layer, an oxygen barrier material layer and a second adhesive tie layer, and a second LDPE layer coated on the inner surface of the multi-layer extrusion, which serves as the product contact layer and the package sealing medium.

In another embodiment of the present invention, a photic barrier layer is added to the above described structure to control light transmission through the packaging. This barrier layer may be a layer of pigmented LDPE.

It is also an object of the present invention to reduce the complexity of aseptic packaging by reducing the typical number of different classes of materials present in the packaging layers from three to two. This is accomplished by making the present structure from just paper and plastics instead of paper, plastics, and aluminum foil.

It is a further object of the present invention to provide an oxygen barrier aseptic packaging that is more recyclable.

It is an object of the invention to provide a heat-sealable, oxygen barrier laminate structure suitable for beverage, food and non-food aseptic packaging applications.

It is another object of the invention to provide an oxygen barrier, aseptic packaging having a thick product contact layer to effect aseptic capabilities within the inner seals of the packaging.

It is another object of the invention to provide an oxygen barrier packaging which is suitable for microwave ovenable applications.

It is yet another object of the invention to provide an oxygen barrier packaging which controls light transmission through the packaging. Other objects and advantages of the invention will become apparent to those skilled in the art upon review of the following detailed description, claims and drawings.

Figure 1:
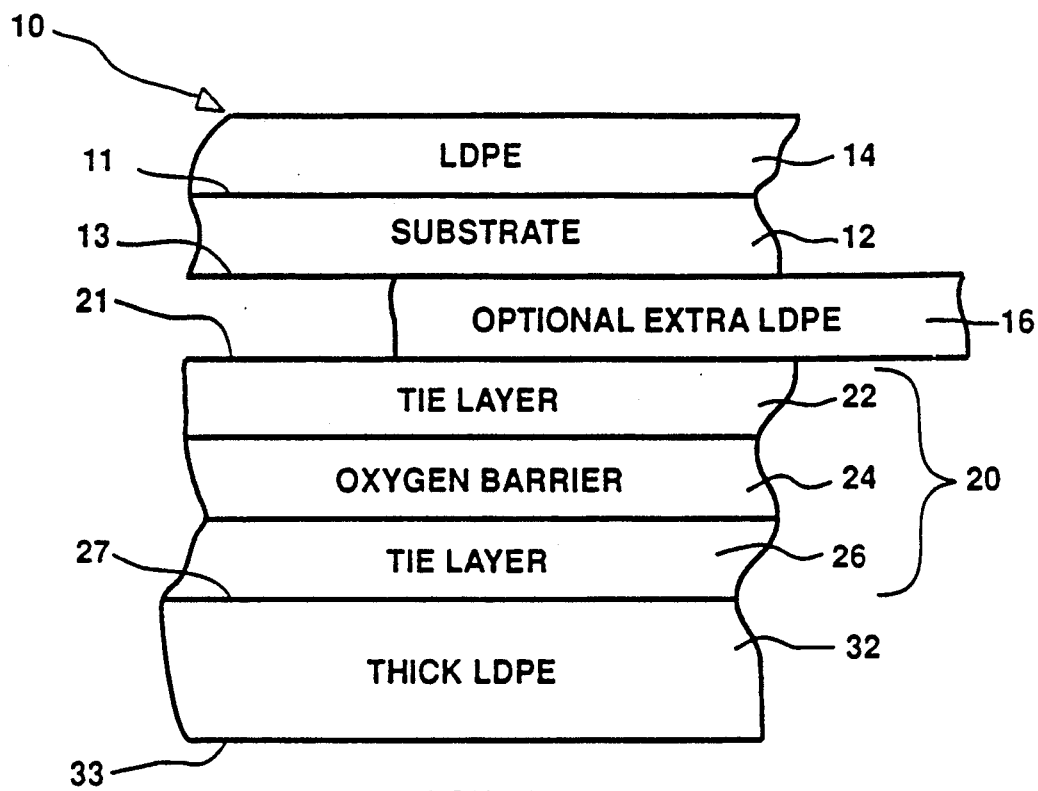
FIG. 1 is an enlarged, cross-sectional view of the laminate structure of the present invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT(S)

An oxygen barrier laminate structure 10 for producing beverage, food, and non-food packagings is illustrated in FIG. 1. The structure 10 includes a substrate 12 such as high grade paperboard stock. It should be recognized that other suitable substrate materials may also be used in the present invention. The substrate 12 has an inner surface 13 and an outer surface 11 and can be of varying thickness and specification depending upon the packaging application, readily known to one of skill in the art.

The structure 10 further preferably includes a layer of low density polyethylene (LDPE) 14 coated on the outer surface 11 of the substrate 12. LDPE is a heat-sealable liquid barrier material which also serves as the print surface for package graphics. The LDPE layer 14 is the outer-most layer of the structure 10 and will contact the atmosphere. This LDPE layer 14 can be of varying thickness depending upon the packaging application. However, when the structure 10 is being used in the production of aseptic juice cartons, the LDPE layer 14 is preferably about 0.64 mil thick (15 grams per square meter).

The structure 10 further preferably includes a multi-layer coextrusion 20 having an outer surface 21 and an inner surface 27 wherein the outer surface 21 is secured on the inner surface 13 of the substrate 12. The multi-layer coextrusion is comprised of a first adhesive tie layer 22, an oxygen barrier layer 24 and a second adhesive tie layer 26. The multi-layer coextrusion is preferably secured onto the inner surface 13 of the substrate 12 in the order listed. In this order, the first adhesive tie layer 22 is contacting the substrate while the second adhesive tie layer 26 is the inner-most layer of the multi-layer coextrusion. However, another option of the present invention is to provide an extra layer 16 of LDPE to the structure 10 which would lie between the substrate 12 and the outer surface 21 of the multi-layer coextrusion 20. This embodiment provides extra adhesion depending upon the materials used for the substrate 12 and the tie layer 22. This extra LDPE layer 16 would preferably be about 10 g/m$^2$ thick although a wide range of thicknesses could be employed effectively.

The thickness of the multi-layer coextrusion 20 may vary depending upon the packaging application. However, when the structure 10 is being used to produce an aseptic juice container, the thickness of the multi-layer coextrusion 20 is preferably about 1.2 mil (30 grams per square meter). When the thickness of the multi-layer coextrusion is about 1.2 mil, the thickness of the first adhesive tie layer 22 is preferably about 0.43 mil (10 grams per square meter), the thickness of the oxygen barrier layer 24 is preferably about 0.33 mil (10 grams per square meter), and the thickness of the second adhesive tie layer 26 is preferably about 0.43 mil (10 grams per square meter).

Although any suitable adhesive tie layer may be used, the tie layers are preferably ethylene-based copolymers. An example of a suitable adhesive tie layer is Plexar 177, manufactured by Quantum Chemical.

The oxygen barrier layer 24 may be comprised of any suitable oxygen barrier that will prevent the transmission of gases through the container. Accordingly, the preferred oxygen barrier layer 24 in the present invention is an ethylene vinyl alcohol copolymer (EVOH). EVOH is available from Eval Company of America. The use of EVOH as the oxygen barrier layer 24 also allows the packaging or container to be suitable for microwave ovenable applications and to be more recyclable.

The structure 10 further includes a second layer 32, preferably LDPE coated on the inner surface 27 of the multi-layer coextrusion. The inner surface of the multi-layer coextrusion 20 corresponds to the inner surface of the second adhesive tie layer 26. This second LDPE layer 32 in the present invention must be at least 1.4 mil thick. When the structure 10 is being used to produce an aseptic packaging container, the second LDPE layer 32 preferably has a thickness of between about 1.4 and 1.7 mil (approximately 32 grams per square meter to 40 grams per square meter, respectively). If the second LDPE layer 32 is not at least 1.4 mil thick (32 grams per square meter), the seals of the container produced from the structure 10 may have unfilled voids or cavities where the layer 32 has not sufficiently "flowed" to fill the voids or cavities, resulting in difficulty in sterilizing the packaging.

Various suitable coating techniques can be utilized to apply the layers to the substrate 12. For example, the substrate 12, preferably paperboard, may be flame treated and then a layer of molten LDPE may be coated onto one surface of the substrate by extrusion coating. The multi-layer coextrusion may be extrusion laminated onto the uncoated surface of the substrate or onto the optional extra LDPE layer 16 if used. Finally, a second LDPE layer may be extrusion coated onto the inner surface of the multi-layer coextrusion to complete the laminate.

Figure 2:
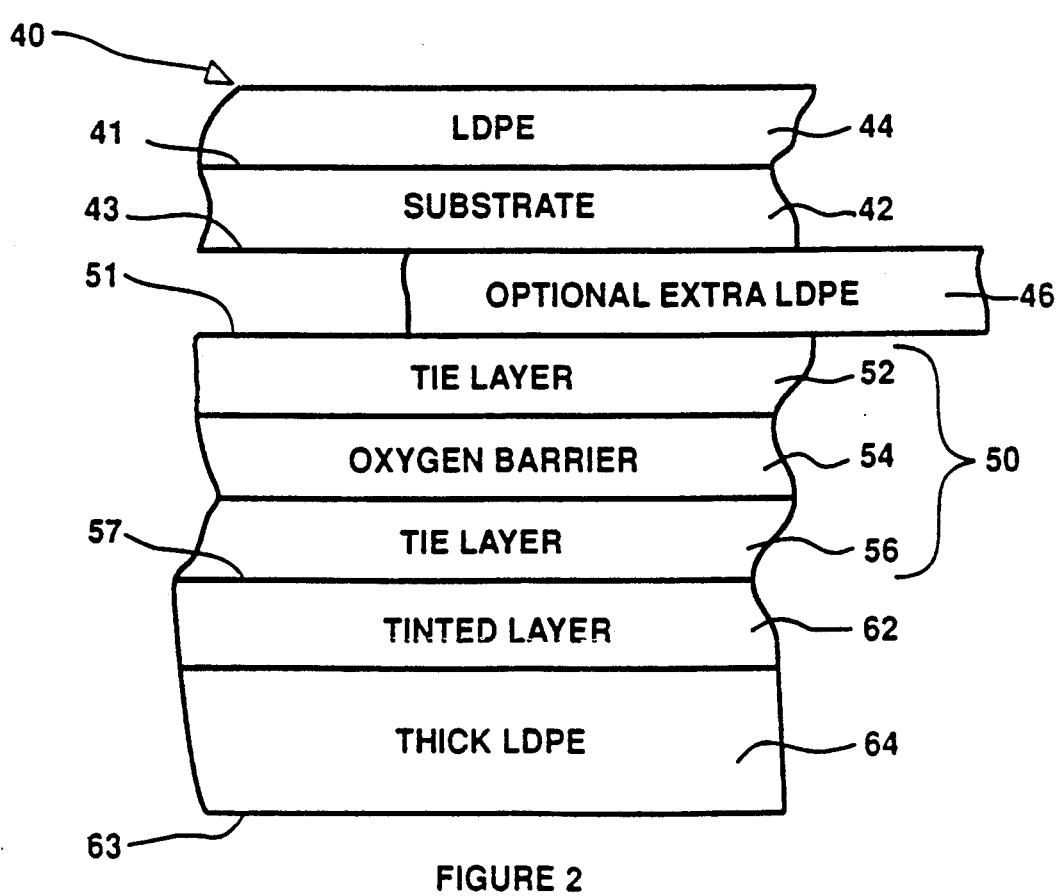
FIG. 2 is an enlarged, cross-sectional view of another embodiment of the laminate structure of the present invention.

In another embodiment of the present invention, as shown in FIG. 2, a pigment dye may be added to a layer 62 preferably LDPE which may be extrusion coated or laminated onto the inner surface 57 of the tie layer 56. Then the inner, thick LDPE layer 64 is coated or laminated onto the pigmented LDPE layer 62. Pigmented polyethylene is available from Quantum Chemical. Once extruded onto the structure 40, preferably in the order shown in FIG. 2, the layer 62 will act to inhibit or block light transmission. The tinted layer 62 is typically 10–12 $g/m^2$ thick in one preferred embodiment. The tinted layer 62 plus layer 64 would not be less than 1.4 mil thick. The remaining layers 42, 44, 52, 54, and optional LDPE extra layer 46, and surfaces 41, 43, 51, and 63 may be assembled in the same manner as described for structure 10 above. This embodiment is just one preferred manner to accomplish light blocking. Other methods include tinting one of the existing layers shown in FIG. 1. Different ways of controlling light transmission include: using black tint to absorb light thereby stopping it from passing through the packaging; using a mirror-like coating within the packaging to reflect light away from the product; and using blockers in the packaging to screen out harmful light such as UV light as is commonly done in sunglasses.

Various features of the invention are set forth in the following claims.

What is claimed is:

1. An aseptic container prepared from an oxygen barrier laminate structure, said laminate structure comprising:

a substrate having an inner surface and an outer surface;

a first low density polyethylene layer coated on said outer surface of said substrate;

a multi-layer coextrusion having an inner surface and an outer surface wherein said outer surface of said multi-layer coextrusion is coated onto the inner surface of said substrate, said multi-layer coextrusion comprising a first adhesive tie layer, an oxygen barrier material layer and a second adhesive tie layer; and a second low density polyethylene layer coated on said inner surface of said multi-layer coextrusion, said second low density polyethylene layer having a thickness of at least 1.4 mil.

2. The structure of claim 1 wherein said oxygen barrier material layer is an ethylene vinyl alcohol copolymer.

3. The structure of claim 2 wherein said adhesive tie layers are an ethylene-based copolymer with functional groups.

4. The structure of claim 1 wherein said substrate is paperboard.

5. The structure of claim 1 further comprising: an extra layer of low density polyethylene coated on said inner surface of said substrate.

6. The structure of claim 2 wherein said oxygen barrier material layer is at least 10 grams per square meter thick.

7. The structure of claim 1, further comprising means for substantially controlling light transmission through said container.

8. An aseptic food and beverage container prepared from an oxygen barrier laminate structure, said structure comprising:

a paperboard substrate having an inner surface and an outer surface;

a first low density polyethylene layer coated on said outer surface of said substrate, said first low density polyethylene layer of a thickness of about 0.6 mil;

a multi-layer coextrusion of a total thickness of about 1.1 mil, having an inner surface and an outer surface wherein said outer surface of said multi-layer coextrusion is coated onto the inner surface of said substrate, said multi-layer coextrusion comprising a first adhesive tie layer about 0.4 mil thick, an ethylene vinyl alcohol copolymer, oxygen barrier layer about 0.3 mil thick, and a second adhesive tie layer about 0.4 mil thick, coated in the order listed; and a second low density polyethylene layer of at least 1.4 mil thick, coated on said inner surface of said multi-layer coextrusion, such that during formation of said container said second low density polyethylene layer is sufficiently thick to fill and caulk any voids and thereby provide a biological seal and a sterilizable inner surface to said container.

9. The structure of claim 8, further comprising: a photic barrier layer of low density polyethylene coated on said inner surface of said multi-layer coextrusion, wherein said photic barrier layer is about 0.4 mil thick and wherein said second low density polyethylene layer together with said photic barrier layer is at least 1.4 mil thick.

* * * * *